No. 853,570. PATENTED MAY 14, 1907.
H. H. WOGAMAN.
TURRET HEAD.
APPLICATION FILED OCT. 27, 1906.
2 SHEETS—SHEET 1.
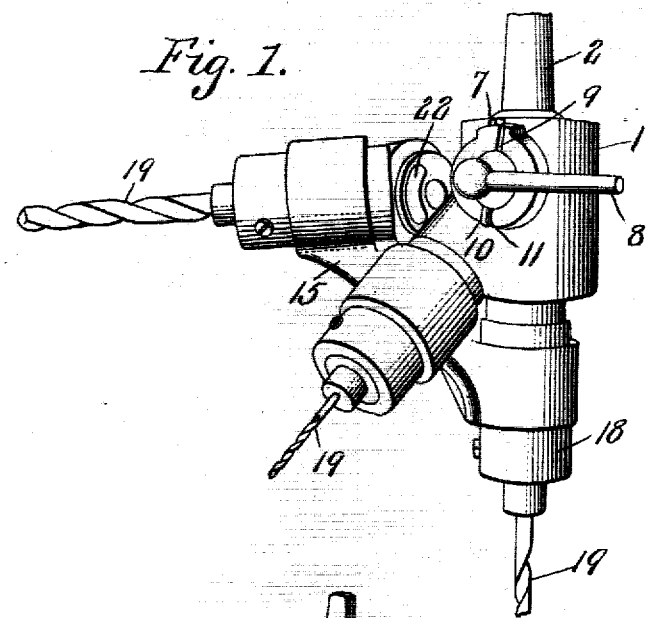
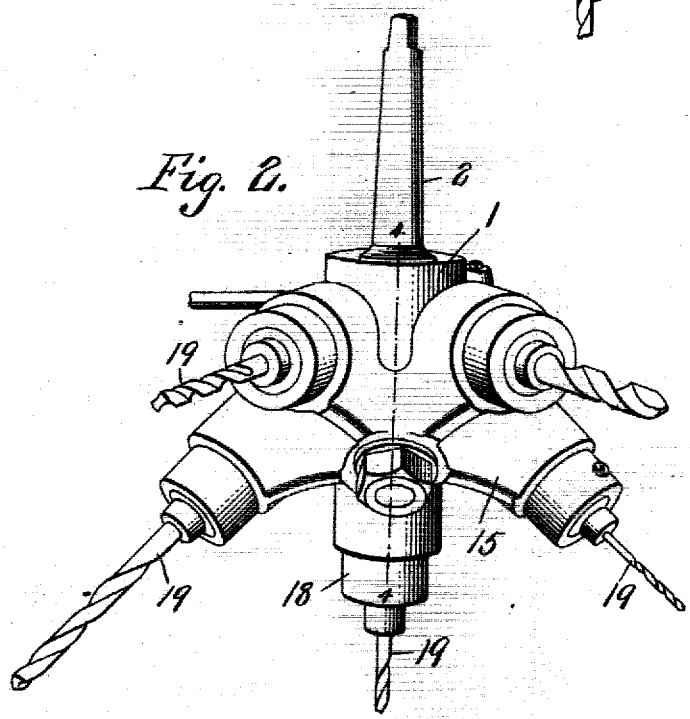
Witnesses
Jos. F. Collins
H. H. Simms
Inventor
H. H. Wogaman
by Knight Bros.
Attorneys No. 853,570. PATENTED MAY 14, 1907.
H. H. WOGAMAN.
TURRET HEAD.
APPLICATION FILED OCT. 27, 1906.
2 SHEETS—SHEET 2.
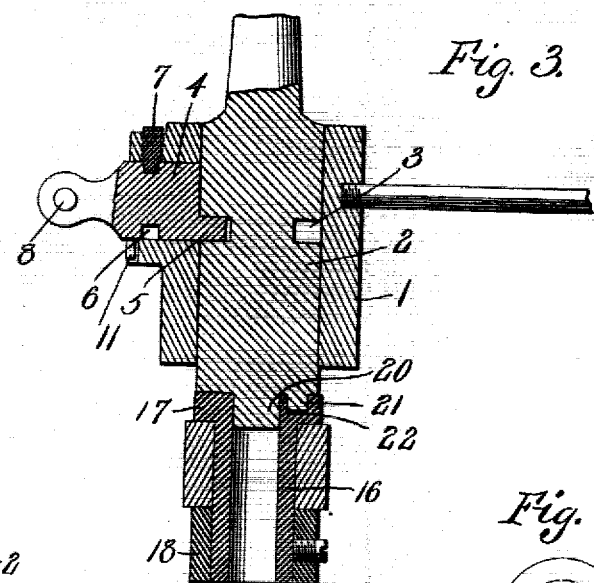
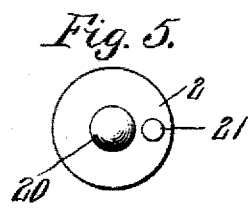
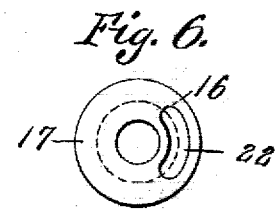
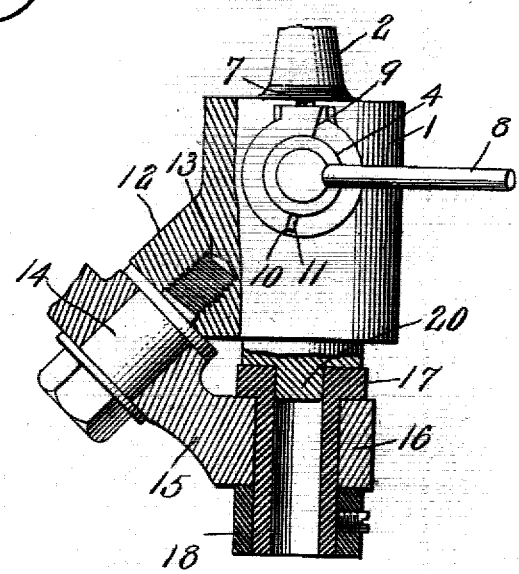
Witnesses
J. W. F. Collins.
H. H. Simms.
Inventor
H. H. Wogaman
by Knight Bros,
Attorneys.

UNITED STATES PATENT OFFICE.

HARRY H. WOGAMAN, OF GREENVILLE, OHIO.

TURRET-HEAD.

No. 853,570.

Specification of Letters Patent.

Patented May 14, 1907.

Application filed October 27, 1906. Serial No. 340,869.

*To all whom it may concern:*

Be it known that I, HARRY H. WOGAMAN, a citizen of the United States, residing at Greenville, in the county of Darke, in the State of Ohio, have invented certain new and useful Improvements in Turret-Heads, of which the following is a specification.

This invention relates to turret heads for drilling machines.

One object of this invention is to improve the clutch connection between the driving spindle and the driven spindles. Heretofore these connections have been such that it has been impossible to shift from one drill to the other without reducing the speed of rotation of the driving spindle. In my invention, the connection is so formed that it is unnecessary to reduce the speed of the driving spindle.

In the drawings, Figure 1 is a perspective view of my improved device. Fig. 2 is a like view from another side. Fig. 3 is a vertical section through the driving spindle and one of the driven spindles. Fig. 4 is a section on line 4—4 Fig. 2, parts being shown in elevation. Figs. 5 and 6 are end views of the driving and the driven spindles respectively.

Referring more particularly to the drawings, 1 indicates a bearing piece having a longitudinal bore, and a transverse bore leading to the longitudinal bore. Within the longitudinal bore is arranged a driving spindle 2, having an annular groove 3. The transverse bore has mounted therein a rotatable head shifter 4 provided at its inner end with an eccentric projection 5 extending into the annular groove 3. To hold the rotatable shifter within the transverse bore, said shifter is provided with an annular groove 5 into which projects a screw 7. The shifter is provided at its outer end with a handle 8 and is limited in its movement by a pair of shoulders 9 and 10 on the bearing piece, and a projection 11 on the shifter.

The bearing piece 1 is further provided with an obliquely disposed boss 12 having a central screw-threaded opening 13. This boss serves for anchoring the screw threaded end of a non-rotating spindle 14 which serves as a bearing for a rotatable head 15. The head 15 is of spider formation and in its arms is journaled a number of hollow driven spindles 16 any one of which is adapted to axially aline with the driving spindle. The hollow spindles 16 are each held to the head by being provided with annular flanges 17 at one end and by a collar 18 at the other end secured to the spindle. The tools 19 are secured with the hollow spindles 16 in any suitable manner.

So that the driving spindle may be connected to any one of the driven spindles, the driving spindle is provided with a central centering boss 20 having a cylindrical portion and a rounded end and an eccentric projection 21 of less length than the cylindrical portion of the centering boss, while the hollows of the driven spindles form central openings into which the boss may project, an arcuate slot 22 being provided in the end of each driven spindle, concentric with the central opening for the purpose of receiving the projection 21 on the driving spindle. This connection between the driving spindle and the driven spindle is such that it is possible to establish connection between these parts without reducing the speed of rotation of the driving spindle.

Having now described my invention, what I claim as new and desire to secure by Letters Patent is:

The combination of a driving spindle having a central boss with a cylindrical portion, and an eccentric projection of less length than the cylindrical portion of the boss, a rotatable head, a plurality of rotatable spindles journaled in the head and each provided with a central opening and an arcuate slot concentric with the opening, and means for shifting the head to cause a rotatable spindle to be connected with or disconnected from the driving spindle.

The foregoing specification signed at Greenville, Ohio, this 10— day of September, 1906.

HARRY H. WOGAMAN.

In presence of two witnesses—
OSCAR R. KRICKENBERGER,
JOHN F. MAHER.